P. E. HOLT.
TRACTOR HOIST AND TRACTOR EXCAVATOR.
APPLICATION FILED MAY 27, 1909.

1,008,338.

Patented Nov. 14, 1911.

4 SHEETS—SHEET 4.

Witnesses.

Inventor.
Pliny E. Holt
by Baldwin Vale
Attorney.

UNITED STATES PATENT OFFICE.

PLINY E. HOLT, OF STOCKTON, CALIFORNIA.

TRACTOR-HOIST AND TRACTOR-EXCAVATOR.

1,008,338.   Specification of Letters Patent.   Patented Nov. 14, 1911.

Application filed May 27, 1909. Serial No. 498,675.

*To all whom it may concern:*

Be it known that I, PLINY E. HOLT, a citizen of the United States, and residing at 836 West Poplar street, in the city of Stockton, county of San Joaquin, and State of California, have invented certain new and useful Improvements in Tractor-Hoists and Tractor-Excavators; and I do hereby declare the following to be a full, clear, and exact description of the said invention, such as will enable others skilled in the art to which it most nearly appertains to make, use, and practice the same.

This invention relates to improvements in tractor hoists and tractor excavators, and consists in the novel construction and combination of the parts as hereinafter described.

The object sought to be accomplished is to combine an autotractor of the traction belt class, with a hoisting and excavating apparatus mounted upon a swinging table and operated by the tractor engine.

Broadly, the invention consists of an autotractor capable of propelling itself under its own power and maneuvering on the surface of the ground; and a hoisting crane and excavating apparatus mounted on a swinging table on the tractor frame, and driven by the tractor engine.

A further object of the invention is to provide an excavator with improved traction mechanism particularly adapted for travel over ground that is too unstable to support the well known traction wheels ordinarily employed; and which can operate independent of rails or other prepared paths; and which is particularly adapted to climb steep grades.

Figure 1:
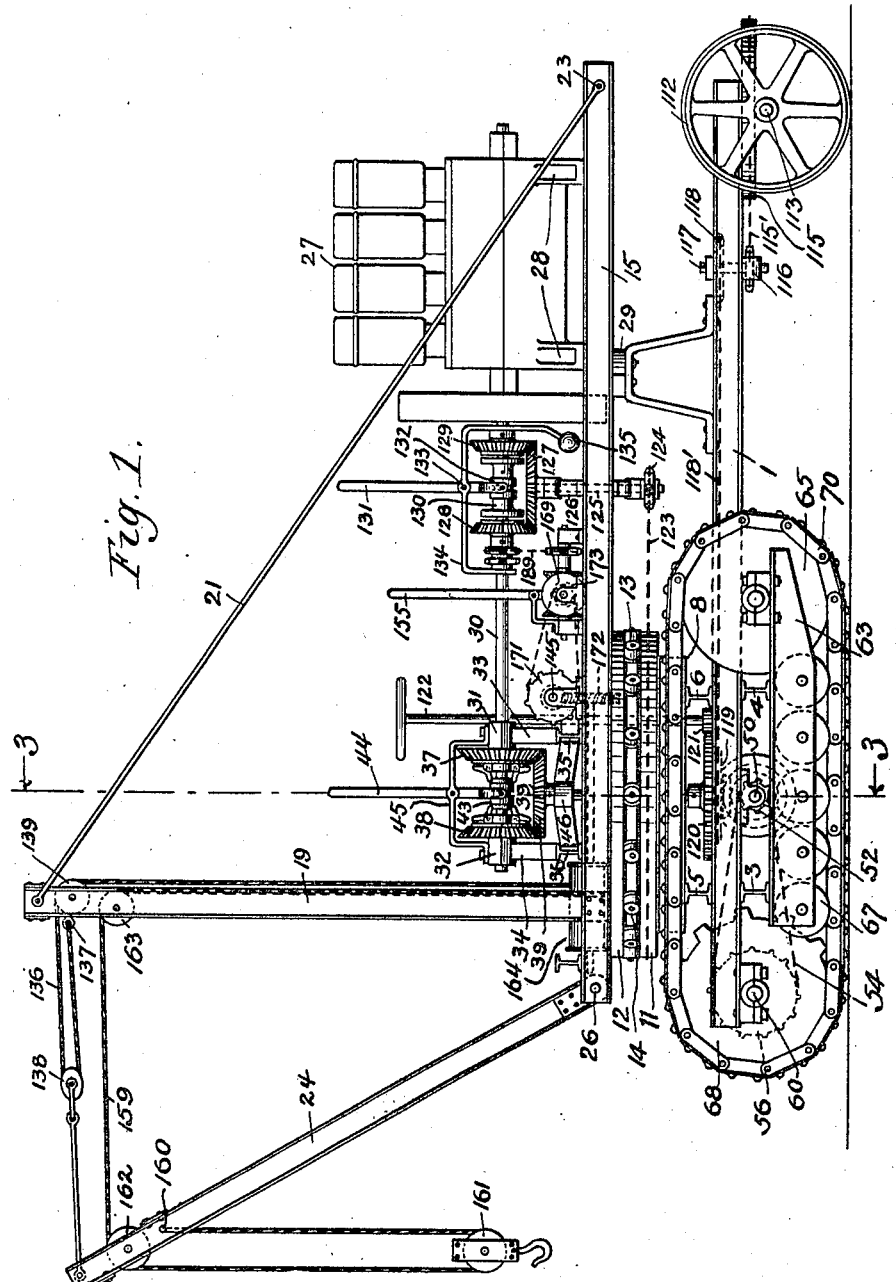
Figure 2:
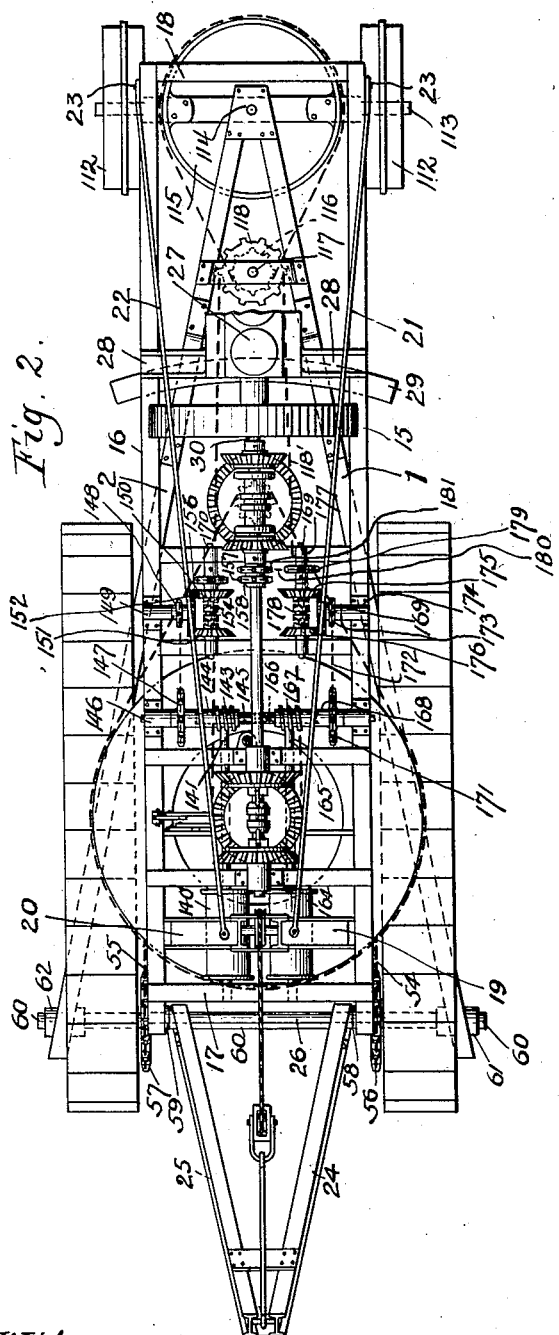
Figure 3:
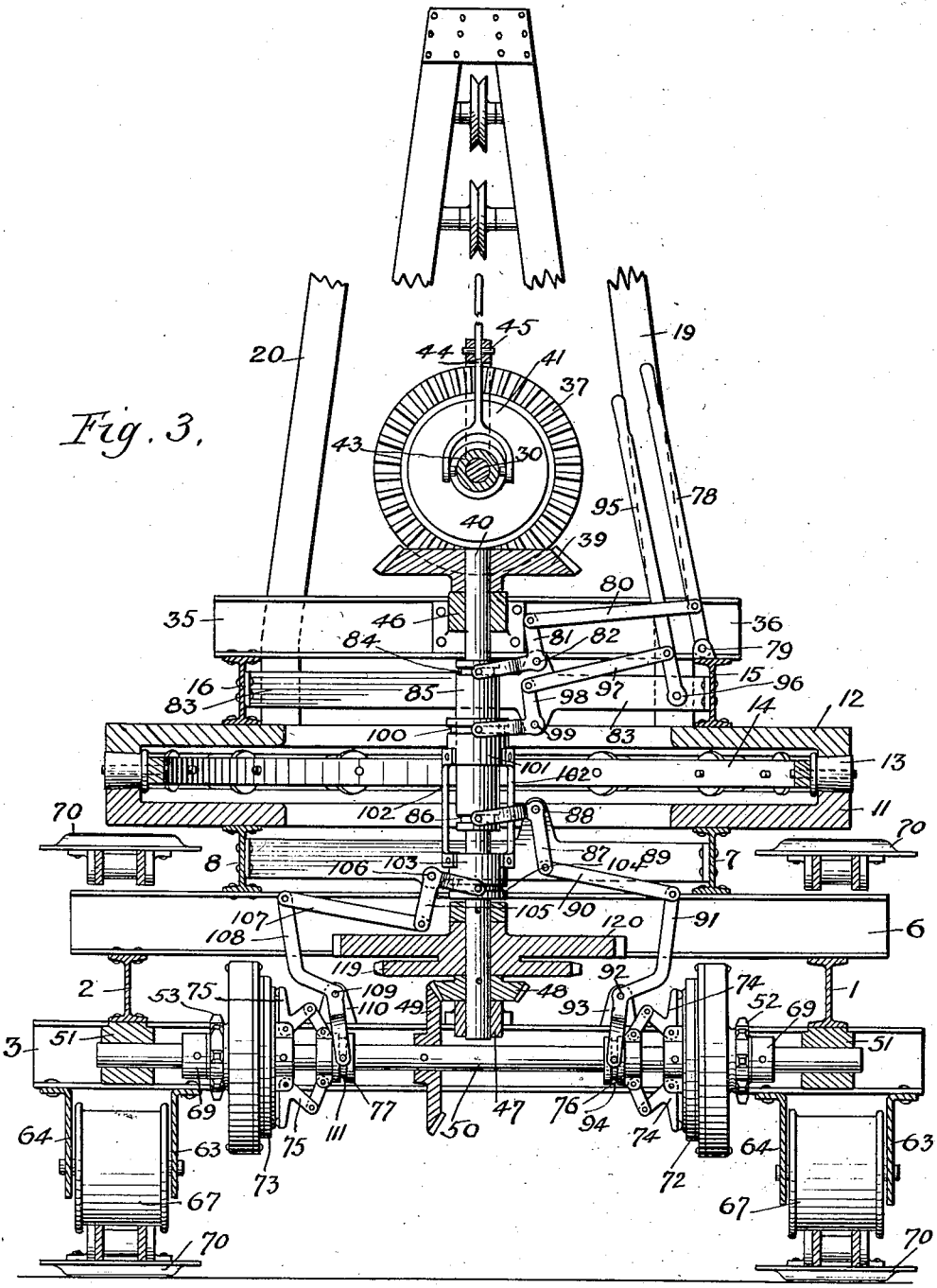
Figure 4:
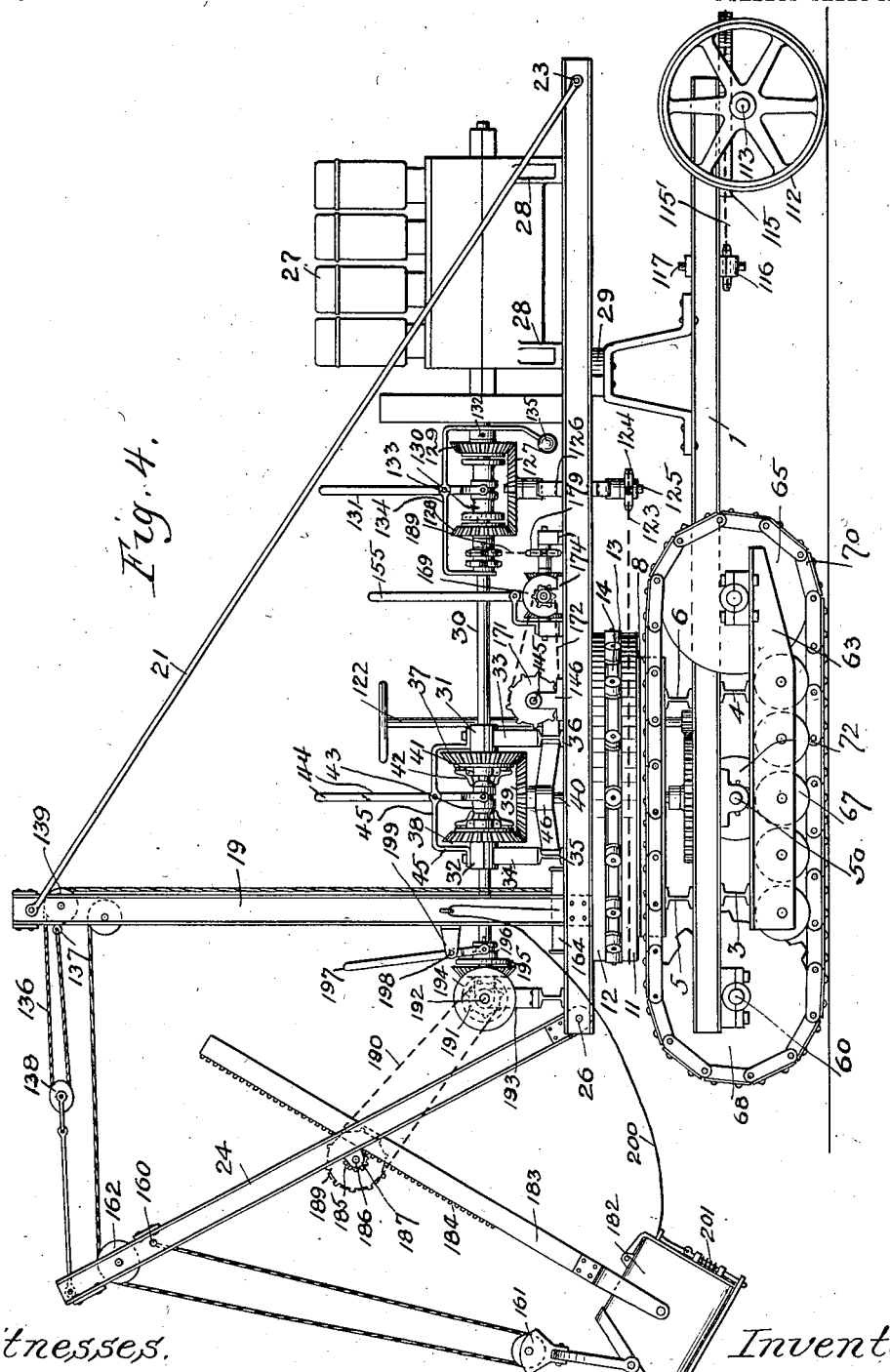

In the accompanying drawings:—Figure 1 is a side elevation of a combined machine drawn to illustrate this invention. Fig. 2 is a plan view from above the same. Fig. 3 is a detail in cross section taken on the line 3—3, Fig. 1, showing the manner of transmitting power to and controlling the traction mechanisms. Fig. 4 is a similar view to Fig. 1, with the addition of a power shovel to the hoisting crane.

In detail, the construction consists of the main frame comprising the side beams 1 and 2, and the base beam 3, and the cross beam 4 constituting a triangular frame with its apex pivoted to the steering truck, and its side beams projecting beyond the main frame and supported by the outer ends of the main axle; the superframe comprising the cross beams 5 and 6, and the superimposed side beams 7 and 8, all rigidly fixed together. The main frame supports a turn table comprising the base plate 11, fixed to the beams 7 and 8, and the swinging plate 12, and the interposed rollers 13, journaled in the free ring 14.

The swinging frame consists of the rectangular frame comprising the side beams 15 and 16, joined to the end beams 17 and 18; the whole frame being rigidly fixed to the turn table and adapted to rotate therewith.

The A frame comprises the side beams 19 and 20, secured at their bases to the turntable, and joined at the top, from whence they are stayed by the guy rods 21 and 22, secured thereto and extending rearward and fixed to the side beams, 15 and 16, as at 23.

The swinging boom comprises the side beams 24 and 25, pivoted at their bases on the pivot rod 26, which extends across the swinging frame and is mounted in the side beams 15 and 16. The head of the boom is suspended by a tackle passing through the head of the A frame.

The power unit consisting of the gas engine 27, or other suitable motor, is located in the swinging frame on the bolsters 28, bridging the side beams thereof, and is so placed as to best counterbalance the load on the turntable. Normally the swinging frame rests upon the sector beam 29, mounted upon the main frame. The main driving shaft 30, is mounted in the pillow blocks 31 and 32, fixed on the brackets 33 and 34, which are mounted upon the cross beams 35 and 36, fixed across the swinging frame, and it is joined to the driving shaft of the power unit.

The tractor is driven from the main shaft through the reversing gear comprising the bevel gears 37 and 38, loosely mounted on the main shaft and meshed with the bevel gear 39, fixed on the vertical shaft 40. The bevel gears 37 and 38 are provided with the friction clutches 41, operated by the dogs 42, pivoted thereon and operated by the cone sleeve, 43, slidably splined on the main shaft. The cone sleeve 43 is operated by the lever 44, pivoted to the bracket 45, fixed on the pillow blocks and adapted to throw the cone sleeve into and out of engagement with either friction clutch. The bevel gears 37 and 38, engage opposite sides of the bevel gear 39; therefore the driving gear clutched to the main shaft determines the direction of rotation of the gear 39. The manner of engaging the clutches makes it impossible to set both clutches at the same time.

The vertical shaft 40 is journaled in the cross bracket 46, between the crossbeams 35 and 36, and in the cross bracket 47, between the cross beams 3 and 4. The rotation of the shaft 40 is transmitted through the bevel pinion 48, fixed thereon, to the bevel gear 49 fixed on the countershaft 50, which is journaled in the brackets 51 fixed to the main frame. Rotation is transmitted from the counter shaft by the sprockets 52 and 53, loosely mounted thereon and connected by the sprocket chains 54 and 55, to the sprockets 56 and 57, fixed on the sleeves 58 and 59, loosely mounted on the axle 60, which is journaled in the boxes 61 and 62, fixed on the ends of the beams 1 and 2.

The traction mechanism consists of the trucks comprising the side beams 63 and 64, having the idle sprockets 65, and the rollers 67 journaled therein. These trucks are mounted on both sides of the machine, and are fixed to the cross beams 3 and 4, of the main frame. The driving sprockets 68, for the traction mechanism are fixed on the main axle 60 in line with the idle sprockets 65, and are adapted to drive the endless traction belts 70, which encircle the driving sprockets and the idlers, and pass beneath the rollers mounted in the trucks.

The sprockets 52 and 53, mounted on the counter shaft are provided with the friction clutches 72 and 73, operated by the dogs 74 and 75, linked to their respective sleeves 76 and 77, slidable on the counter shaft, whereby the traction mechanisms are independently driven singly, or in unison. The thrust of the clutches is taken up by the collars 69, fixed upon the counter shaft.

The sleeve 76, controlling the right traction mechanism is operated by the hand lever 78, pivoted on the swinging frame, as at 79, and connected by the link 80, to the bell crank lever 81, pivoted at 82, on the brace 83. This bell crank lever is provided with a yoke with pins adapted to engage the groove 84, in the end of the sleeve, 85, slidable on the vertical shaft 40. The opposite end of this sleeve is provided with the groove 86, engaging the yoke end of the bell crank lever 87, which is fulcrumed, as at 88, on the cross brace 89, and connected by the link 90 to the bell crank lever 91, fulcrumed, as at 92, to the bracket 93 on the main frame. This lever 91 engages the groove 94, in the sleeve 76, whereby the lateral swing of the hand lever 78, is transformed by intermediate levers to a vertical movement of the sleeve 85 which motion is in turn retransformed to a lateral motion at the sleeve 76, by the intermediate levers.

The sleeve 77, controlling the left traction mechanism is operated by the hand lever 95, pivoted on the swinging frame, as at 96, and connected by the link 97, to the bell crank lever 98, fulcrumed, as at 99, on the brace 83. This bell crank lever is provided with a yoke with pins adapted to engage the groove 100, in the sleeve 101, slidable over the sleeve 85, and is connected by the straps 102, to a similar sleeve 103, slidable on the vertical shaft below the sleeve 85. The sleeve 103 is provided with the groove 104, engaging the yoke end of the bell crank lever 105, which is fulcrumed, as at 106, to the cross brace 89, and connected by the link 107, to the bell crank lever 108, fulcrumed, as at 109, to the bracket 110 on the main frame. This lever 108 engages the groove 111, in the sleeve 77, whereby the lateral swing of the hand lever 95, is transformed by intermediate levers to a vertical motion of the sleeve 101, which motion is in turn retransformed to a lateral motion at the sleeve 77, by the intermediate levers.

The independent driving of the traction mechanisms is provided as a substitute for the differential gear, as a much shorter turn can be made by releasing the clutch on one traction belt and permitting the other traction belt to travel around it as on a pivot, rather than to rely entirely upon the steering mechanism which may be inadequate in soft or unstable ground, or unable to turn the tractor in as short a space as is possible by releasing one driver as described.

The steering mechanism consists of the front truck comprising the wheels 112, mounted upon the axle 113, which is pivoted, as at 114, under the apex of the triangular frame. The drum 115, is fixed upon the axle concentric with the pivot 114. The sprocket chain 115′ is fixed to the drum, and engages the sprocket 116, fixed on the shaft 117, mounted on the main frame. The shaft 117, is rotated by a sprocket 118, fixed thereon and connected by the sprocket chain 118′ to the main sprocket 119, loosely mounted upon the vertical shaft 40. The main sprocket 119, is integral with the spur gear 120, which meshes with the pinion 121, fixed on the steering column 122, mounted on the swinging frame.

The turntable is swung by the sprocket chain 123, encircling the same and engaging the driving sprocket 124, fixed upon the vertical shaft 125, mounted on the cross brackets 126, on the swinging frame. This shaft is actuated by a bevel gear 127, fixed thereon and meshed with two gears 128 and 129, loosely mounted upon the main driving shaft 30, and independently operated by a friction member 130, slidably feathered to the main driving shaft. The friction member is operated by a hand lever 131, having a yoke head and pins to engage a groove 132, in the friction member. This hand lever is fulcrumed, as at 133, in a bracket 134, swung on the main driving shaft and counterbalanced by the weight 135, thereon. The swing of the turntable to the right or left is controlled by the manipulation of the friction member in contact with the driving gear.

The swinging boom is controlled by the cable tackle comprising the cable 136, having one end fixed to the head of the A frame, as at 137, and passed around the pulley 138, attached to the head of the boom. The cable passes over the pulley 139, fixed in the head of the A frame, and is wound around the drum 140, to which it is fixed. This drum is mounted in boxes fixed to the cross beams of the swinging frame. The drum shaft 141, of the drum 140, is rotated by the worm gear 142, fixed thereon and meshed with the worm 143, fixed on the sleeve 144, which is loosely mounted on the shaft 145, mounted in the brackets 146, fixed on the swinging frame. This sleeve 144, is driven by the sprocket 147, which is fixed thereon and is connected by a sprocket belt to the driving sprocket 148, mounted on a jack shaft, which is mounted in the bracket 149, fixed on the swinging frame. The sprocket 148 is integral with the bevel gear 152, meshed with the reversing gears 150 and 151, loosely mounted upon the driving shaft 170, which is journaled in the pillow blocks fixed between two cross beams of the swinging frame. The reversing gears are driven by a clutch dog 154, slidably splined to the driving shaft 170, and is operated by a hand lever 155, fulcrumed to the swinging frame. The shaft 170, is driven by the sprocket 156, which is driven by the sprocket belt 157, engaging the sprocket 158, fixed on the main driving shaft 30. The reversing gear controls the direction of rotation of the winding drum to raise or lower the boom.

The hoisting tackle consists of the cable 159, fixed at one end to the head of the boom, as at 160; passed around the hook pulley 161; over the pulley 162, journaled in the head of the boom; over the pulley 163, journaled in the head of the A frame; and wound around the drum 164, to which it is fixed. This drum is mounted in boxes fixed to the cross beams of the swinging frame. The drum shaft 165, of the drum 164, is rotated by the worm gear 166, fixed thereon, and meshed with the worm 167, fixed on the sleeve 168, which is loosely mounted on the shaft 145, mounted in the brackets 146, fixed on the swinging frame. This sleeve is driven by the sprocket 171, which is fixed thereon and is connected by a sprocket belt 172, to the driving sprocket 173, mounted on a jack shaft, which is mounted in the bracket 174, fixed on the swinging frame. The sprocket 173, is integral with the bevel gear 169, meshed with the reversing gears 175 and 176, loosely mounted upon the driving shaft which is journaled in the pillow blocks 177, fixed between two cross beams of the swinging frame. The reversing gears are driven by a clutch dog 178, slidably splined to the driving shaft 169, and are operated by a hand lever, similar to 155, fulcrumed to the swinging frame. The shaft 169, is driven by the sprocket 179, which is driven by the sprocket belt 180, engaging the sprocket 181, fixed on the main driving shaft 30. The reversing gear controls the direction of rotation of the hoisting drum to raise or lower the load supported by the hook pulley 161. The driving mechanisms for both winding drums are identical in every respect.

The power shovel excavator consists of the usual scoop bucket, 182, pivotally mounted in the yoke of the running arm 183. The bucket is suspended from the hook pulley 161, and is raised and lowered by the hoisting tackle just as any other load would be. The running arm is controlled and operated by the rack bar 184, fixed thereto and meshed with the pinion 185, fixed on the shaft 186, which is journaled in the boxes 187, fixed to the side of the beam of the boom. The shaft 186, is driven by the sprocket 189 fixed thereon and driven by the sprocket belt 190, engaging a sprocket 191, fixed upon the jack shaft 192. This jack shaft is journaled in the bracket 193, fixed on the swinging frame, and is driven by the bevel gear 194, meshed with a clutch gear 195, loosely mounted on the main driving shaft 30. The gear 195, is controlled by a friction member 196, slidably splined to the main driving shaft and controlled by the hand lever 197, fulcrumed, as at 198, in the bracket 199, fixed to the A frame. The contents of the bucket are dumped after filling and swinging to the desired position by pulling the cord 200, controlling the latch 201, of the swinging bottom of the bucket, in the usual manner.

Having thus described this invention what is claimed and desired to secure by Letters Patent is:—

1. In an autotractor hoist and excavator, a triangular main frame, a swinging frame mounted on said main frame at the base of said triangle, a motor mounted on said swinging frame, means operatively connected with said motor for moving said swinging frame, endless traction members for propelling said main frame, a vertical shaft for driving said traction members, and operatively connected with said motor, and means mounted on said shaft for independently controlling said traction members.

2. In an autotractor hoist and excavator, a main frame of triangular form, a swinging frame pivotally mounted on said main frame at the base of the triangle, a motor mounted on said swinging frame, means operatively connected with the motor for swinging said frame, traction mechanism supporting said frame at the base of the triangle thereof and operatively connected with said motor, a steering wheel located at the apex of the triangle, and means for controlling said steering wheel.

3. In an autotractor a main frame mounted upon an endless traction belt traction mechanism, a turntable mounted upon said main frame, a swinging frame mounted upon said turntable, a motive mechanism mounted upon said swinging frame, a traction driving mechanism connected with said motive mechanism, a hoisting mechanism mounted upon said swinging frame and connected with said motive mechanism, means for rotating said turntable connected to said motive mechanism, and a steering mechanism mounted upon said main frame.

4. In an autotractor hoist and excavator, a main frame of triangular form, a swinging frame mounted on said main frame at the base of the triangle, a motor mounted on said swinging frame, means operatively connected with said motor for moving said swinging frame, endless traction members for propelling said main frame and operatively connected with said motor, means for independently controlling said traction members and a hoisting mechanism mounted upon said swinging frame and operatively connected with said motor.

5. In an autotractor hoist and excavator, a main frame of triangular form, a swinging frame mounted on said main frame at the base of the triangle, a motor mounted on said swinging frame, means operatively connected with said motor for moving said swinging frame, endless traction members at the base of the triangle for propelling said main frame and operatively connected with said motor, means for independently controlling said traction members, a hoisting mechanism mounted upon said swinging frame and operatively connected with said motor, an excavator connected with said hoisting mechanism, and means operated by said motor for controlling said hoisting mechanism.

In testimony whereof, I have hereunto set my hand this 3rd day of May, 1909.

PLINY E. HOLT.

Witnesses:
H. J. VAN VALKENBURG,
J. VAN VALKENBURG.